(No Model.) 2 Sheets—Sheet 1.

J. M. JOHNSON.
SEED PLANTER AND FERTILIZER DISTRIBUTER.

No. 428,341. Patented May 20, 1890.

Fig. 1ª

WITNESSES:
INVENTOR:
J. M. Johnson
BY Munn & Co
ATTORNEYS (No Model.) 2 Sheets—Sheet 2.

J. M. JOHNSON.
SEED PLANTER AND FERTILIZER DISTRIBUTER.

No. 428,341. Patented May 20, 1890.

WITNESSES:

INVENTOR:
J. M. Johnson
BY
Munn & Co.
ATTORNEYS

UNITED STATES PATENT OFFICE.

JOHN MILLER JOHNSON, OF PROSPERITY, SOUTH CAROLINA.

SEED-PLANTER AND FERTILIZER-DISTRIBUTER.

SPECIFICATION forming part of Letters Patent No. 428,341, dated May 20, 1890.

Application filed January 17, 1890. Serial No. 337,251. (No model.)

*To all whom it may concern:*

Be it known that I, JOHN MILLER JOHNSON, of Prosperity, in the county of Newberry and State of South Carolina, have invented a new and Improved Seed-Planter and Fertilizer-Distributer, of which the following is a full, clear, and exact description.

My invention relates to seed-planters and fertilizer-distributers, and has for its object to provide a simple, comparatively inexpensive, and efficient machine of the sulky class, which will simultaneously plant two rows of cotton or other seed or distribute two lines of fertilizer at variable distances apart, and whether the rows or lines be straight or laterally crooked, and most of the mechanism is within easy reach or control of the driver from his seat on the sulky.

The invention consists in certain novel features of construction and combinations of parts of the seed-planter and fertilizer-distributer, all as hereinafter described and claimed.

Reference is to be had to the accompanying drawings, forming a part of this specification, in which similar letters of reference indicate corresponding parts in all the figures.

Figure 1:
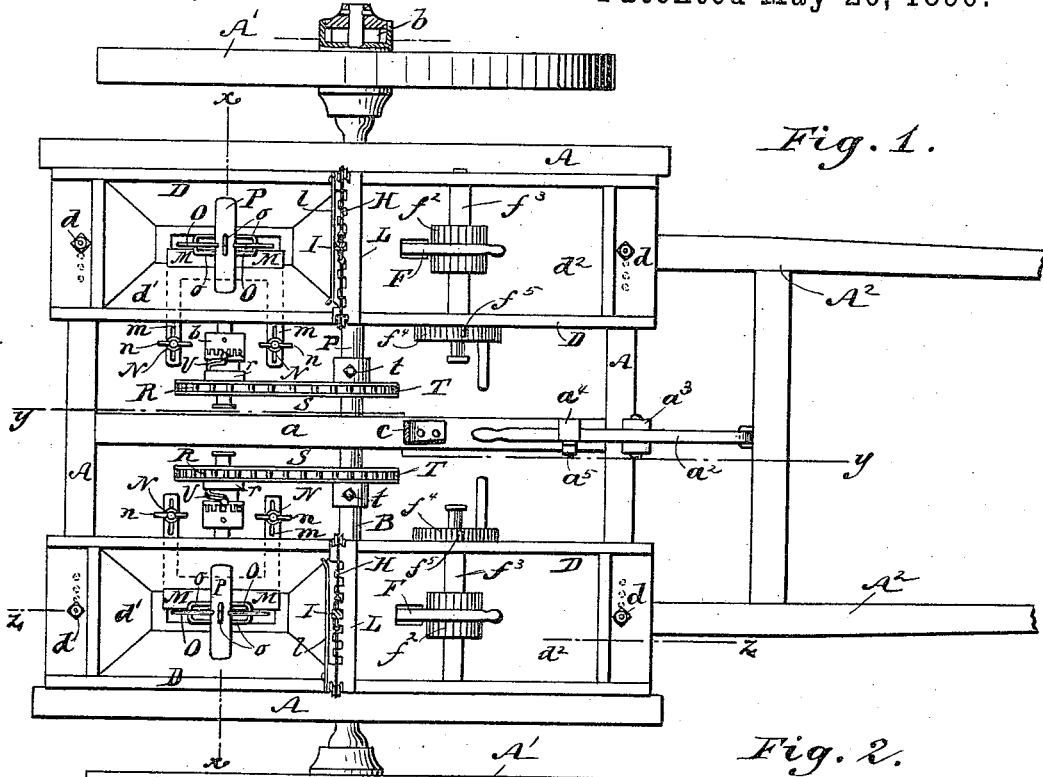
Figure 2:
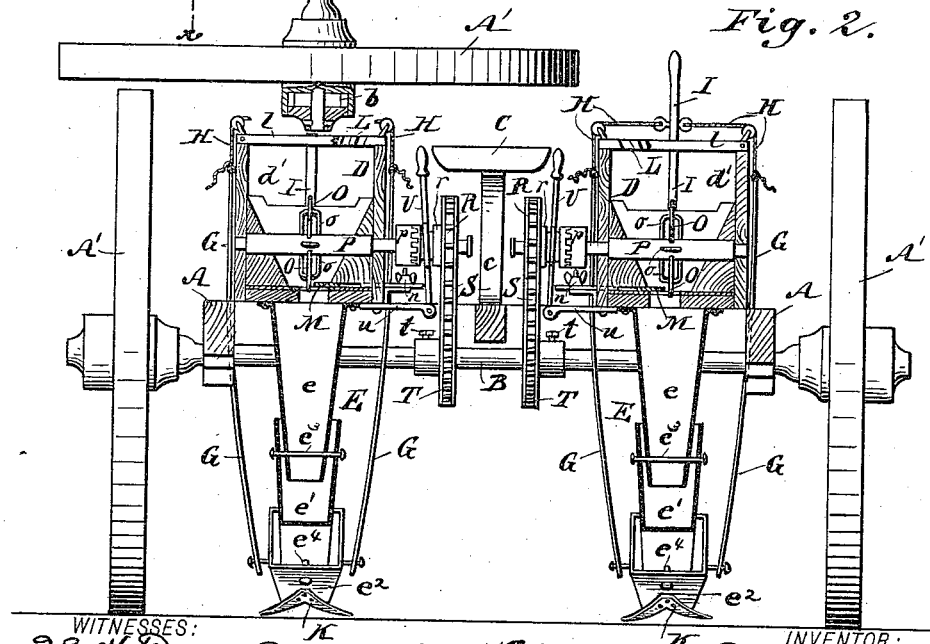
Figure 3:
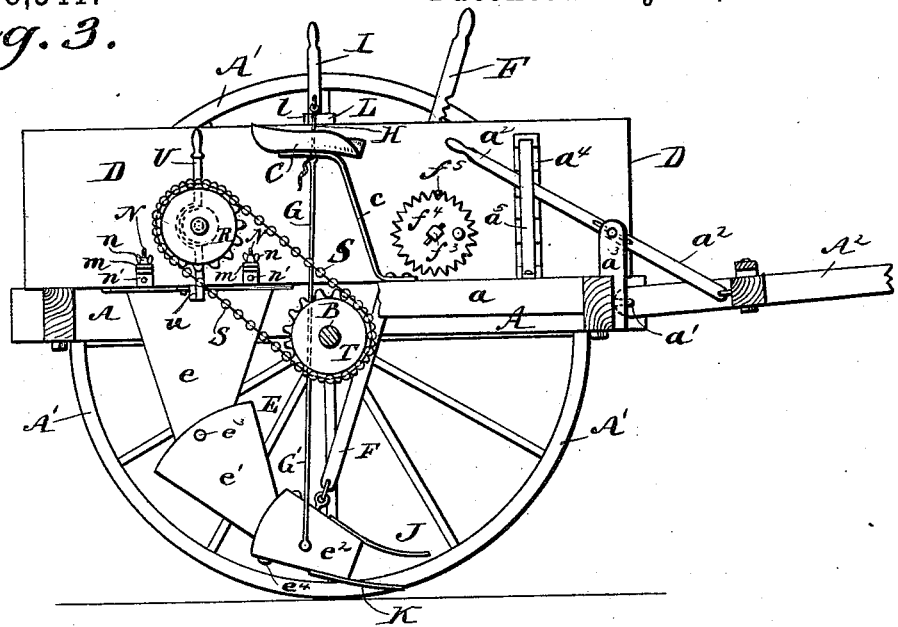
Figure 4:
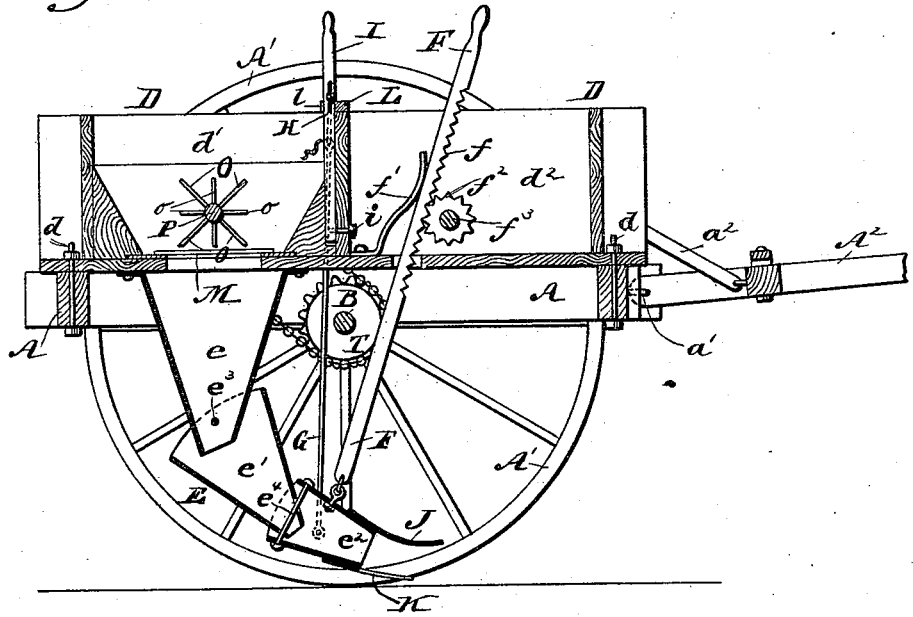

Figure 1 is a plan view of my improved seed-planter and fertilizer-distributer with the seat removed. Fig. 1ª is a detail sectional view of the clutch-connection of the wheels with the axle. Fig. 2 is a transverse vertical sectional elevation of the machine, taken on the line $x\ x$ in Fig. 1. Fig. 3 is a longitudinal vertical sectional view taken on the line $y\ y$ in Fig. 1, and Fig. 4 is a like view taken on the line $z\ z$ in Fig. 1.

The operating parts of the machine are mounted on an ordinary sulky, comprising a frame or body A and wheels A' A', fitted to an axle B, the wheels and axle being connected by the usual or any approved ratchet and pawl devices $b$, allowing either wheel to turn backward without effect on the axle, and compelling forward rotation of the axle with either wheel which outruns the other, and allowing the machine to be backed without rotating the axle backward. To a longitudinal center bar $a$ of the frame is held the foot of a spring-standard $c$, which sustains the seat C for the driver and operator of the machine. The shafts A² have a hinged connection at $a'$ with the frame A, and a lever $a^2$, which is connected at one end to the shafts, is fulcrumed to a standard $a^3$ on the frame, and works at its rear end along a notched upright $a^4$, with which it is held engaged by a spring $a^5$. Thus arranged the shafts, or it may be a pole if the latter is used, may be adjusted and held at any required elevation to maintain the level of the frame by simply adjusting the lever $a^2$ and locking it into a tooth or notch of the upright $a^4$.

Upon the frame A are supported two seed-boxes D D, one at each side. These boxes are held so as to be laterally adjustable toward and from each other by means of bolts $d$, which enter the frame or suitable plates fixed thereto. This allows the boxes to be set for simultaneously planting two rows of seed or drilling in two rows of fertilizer at any required distance apart as the machine is drawn over the field. I divide each of the boxes D into two compartments $d'\ d^2$, the former having a hopper-shaped bottom and a contracted throat, through which the seed or fertilizer falls. The other compartment $d^2$ accommodates mechanism, presently described, for vertically adjusting the universally-jointed planting-shoe E, and may also be used to hold a reserve supply of seed or fertilizer to be transferred to the hopper.

The planter-shoe E is made in three parts—an upper part $e$, which is fixed beneath the box D and tapers downward, a middle section or part $e'$, which is pivoted on a lateral pin or bolt $e^3$ to the lower end of the part $e$, and a lower nose or foot part or section $e^2$, which is pivoted by a pin or bolt $e^4$ to the lower end of the middle section $e'$. The bolts $e^3\ e^4$ range at right angles to each other, thus allowing the two lower parts $e'\ e^2$ of the shoe to be adjusted vertically on the bolt $e^3$ as a center of motion, while allowing the foot or opener and coverer carrying section $e^2$ to be adjusted laterally to either side on the bolt $e^4$ as a center. This universal jointing of the parts of the planter-shoe, allowing both its vertical adjustment to proper depth in the soil or clear above it, and also permitting its lateral adjustment to run properly or parallel with a more or less crooked ridge or line of planting, I consider very desirable features of my invention.

The shoe may be adjusted vertically by a rod or bar F, which is attached to the lower shoe-section $e^2$ and extends up through a hole or guide in the bottom of the compartment $d^2$ of the box D, and is provided with a rack or series of teeth $f$, which, by a spring $f'$, held to the box, are normally engaged with peripheral teeth of a pinion $f^2$, fast on a shaft $f^3$, journaled transversely in the box and provided outside of it and preferably at the inner face of the box with a toothed wheel $f^4$, preferably having a handle by which it may be turned for turning the pinion $f^2$, and thereby raising or lowering the foot of the planter-shoe. The wheel $f^4$ is fitted to a squared or flattened part of the shaft $f^3$, and may be slid along the shaft to disengage it from a pin $f^5$, fixed in the side of the seed-box to allow the wheel to be turned to vertically adjust the shoe, as above described, and when the proper adjustment is obtained the wheel will be slipped back again to the side of the box to cause the pin $f^5$ to enter between any two of its teeth, and thereby lock the rod F and the shoe against vertical movement either up or down.

The lateral adjustment of the shoe-nose section $e^2$ is obtained by a pair of rods G G, which are suitably attached one to each side of the part $e^2$, and extend upward at opposite sides of the seed-box D, and near its top are connected to a pair of ropes H H, which are suitably fixed to the upper end of a lever I, which at $i$ is fulcrumed at its lower end within the box D. It is manifest that by swinging the lever I over to the right hand the shoe-nose section $e^2$ will be shifted toward the left and the opposite movement of the lever will shift the part $e^2$ toward the right hand, thus allowing the furrow-opening plow J, which is fixed to the front of the section $e^2$, to be guided by the attendant shifting the lever I to open the furrow directly at the top of a more or less crooked ridge raised in the earth to receive the seed. The coverer K, fixed to the rear side of the shoe-section, will of course follow the plow J and cover the seed, however crooked the ridge may be. The lever I works along the notched edge of a latch-bar L, to which a spring $l$ is held so as to press the lever into one of the bar-notches to lock the lever and consequently hold the shoe-section $e^2$ at any required lateral adjustment. The cords or ropes H may run over pulleys held to the box D, and will be connected to the rods G, so as to be taut, however the part $e^2$ of the shoe may be vertically adjusted by the rod F and its connections.

The quantity of seed or fertilizer discharged from either or both boxes D is governed by the adjustment of a slide M, which is fitted upon or at the slotted bottom of the hopper, or upon a slotted metal plate held thereto, and is provided with a couple of laterally-projecting arms or rods $m\ m$, which have slots receiving bolts N, which are fixed to lugs $n'$, preferably held to the outside face and inner wall of the hopper, and are provided with thumb or set nuts $n$, which may be turned down tightly onto the slide or gage arms $m\ m$, to lock the slide at any desired adjustment to close the mouth of the hopper more or less, as the nature of the seed may require to feed a proper quantity to the ground.

The seed is fed or forced through the bottom opening of the hopper by a series of pins or arms O, preferably four, which are fixed in and project radially from a shaft P, journaled across the hopper, and provided, preferably, at its inner end with a half-clutch device $p$, which may be engaged by a half-clutch $r$, fixed to a chain-wheel R, which is loose on the shaft P, and from which a chain S leads to a driving-wheel T, held adjustably by a set-screw $t$ or otherwise to the axle B of the machine. A lever U, fulcrumed to a support $u$ on the box D, or it may be directly to the box, engages a peripheral groove of the clutch $r$ of the chain-wheel R, and provides for throwing the hopper-shaft P into or out of gear with the axle. When the seed-boxes D D are laterally adjusted on the frame to suit the varying distances apart of the hills or drills, the chain-wheels T T will likewise be laterally adjusted on the axle.

The seed-feeding arms or pins O would alone be liable to simply cut a groove or path through the mass of cotton-seed in the hopper and permit the seed to clog therein. To avoid this I fasten to the shaft P a series of bent or ∩-shaped agitators $o$, which project radially from the shaft and in a plane transversely of the machine. These agitators project each side of the arms O and break up the mass of seed in a manner causing a constant and uniform feed of seed through the hopper-discharge opening by the arms, the rate of discharge being controlled by the adjustment of the slide or gage M, as hereinbefore explained.

It will be noticed that the rods and levers F I for vertically and laterally adjusting the sectional seed-dropping shoe E, and also the levers U for throwing the seed feeding and agitating devices P O $o$ into and out of gear with the main axle, and also the seed-dropping gages or slides M, are all within easy reach of the attendant or driver on the seat C; hence when the seed-boxes D D and chain-wheels T T are once adjusted and the boxes are supplied with seed or fertilizer every other adjustment may be made by the attendant from his seat to regulate the dropping of the seed or fertilizer in desired quantity at any required depth in the soil and within straight or laterally-crooked furrows or drills, and the dropping of seed may be discontinued at pleasure and as is required when the shoe E is raised above the ground when the machine is traveling on the road or is turning corners of the field. For dropping fertilizers arms O, having comparatively broad outer ends, will be used on the shaft P to assure dropping of sufficient quantity in the hills or drills, as will readily be understood.

Having thus described my invention, what I claim as new, and desire to secure by Letters Patent, is—

1. In a seed-planter, the combination, with the frame and a seed-box thereon, of a universally-jointed vertically and laterally adjustable shoe receiving and delivering the seed, substantially as herein set forth.

2. In a seed-planter, the combination, with the frame and a seed-box thereon, of a universally-jointed shoe E, consisting of an upper section $e$, held to the box, a middle section $e'$, pivoted on a horizontal pin $e^3$ to the part $e$, and a nose-section $e^2$, pivoted on a pin $e^4$ to the lower end of the part $e'$, and means, substantially as specified, for vertically and laterally adjusting the shoe, substantially as herein set forth.

3. In a seed-planter, the combination, with the frame, a seed-box thereon, and a universally-jointed shoe E, comprising sections $e\ e'\ e^2$, and held to the box, of a rod F and side rods G G, held to the shoe-section $e^2$, means for locking the rod F when adjusted, a lever I, fulcrumed to the box, and ropes H H, connecting said lever with the rods G G, substantially as herein set forth.

4. In a seed-planter, the combination, with the seed-box, a universally-jointed shoe E, connected thereto, and a rod F, connected to the nose-section of the shoe and having a rack $f$, of a shaft $f^3$ in the box, a pinion $f^2$, and wheel $f^4$ on said shaft, and a locking-pin $f^5$ in the box, substantially as herein set forth.

5. In a seed-planter, the combination, with the seed-box, a universally-jointed shoe E, connected thereto, and side rods G G, attached to the nose-section of the shoe, of a lever I on the box, ropes H H, connected to said lever and to the rods G G, and a latch device for the lever, substantially as herein set forth.

JOHN MILLER JOHNSON.

Witnesses:
WM. A. MOSELEY,
E. P. CROMER.